US012715821B2

(12) United States Patent
Epshteyn et al.

(10) Patent No.: US 12,715,821 B2
(45) Date of Patent: Aug. 25, 2026

(54) METAL HYDRIDE NANOPARTICLES

(71) Applicant: The Government of the United States of America, as represented by the Secretary of the Navy, Arlington, VA (US)

(72) Inventors: Albert Epshteyn, Potomac, MD (US); Zachary J. Huba, Oakland Park, FL (US); Matthew Finn, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 64 days.

(21) Appl. No.: 18/614,997

(22) Filed: Mar. 25, 2024

(65) Prior Publication Data

US 2024/0228399 A1 Jul. 11, 2024

Related U.S. Application Data

(60) Continuation-in-part of application No. 17/110,659, filed on Dec. 3, 2020, now Pat. No. 11,939,276, which is a division of application No. 15/367,277, filed on Dec. 2, 2016, now Pat. No. 10,889,531.

(51) Int. Cl.

| | |
|---|---|
| ***C06B 43/00*** | (2006.01) |
| ***C01B 6/23*** | (2006.01) |
| ***C01B 6/24*** | (2006.01) |

(52) U.S. Cl.

CPC ................ *C06B 43/00* (2013.01); *C01B 6/23* (2013.01); *C01B 6/243* (2013.01); *C01P 2002/02* (2013.01); *C01P 2002/72* (2013.01); *C01P 2002/86* (2013.01); *C01P 2002/88* (2013.01); *C01P 2002/89* (2013.01); *C01P 2004/03* (2013.01); *C01P 2004/04* (2013.01)

(58) Field of Classification Search

None

See application file for complete search history.

(56) References Cited

U.S. PATENT DOCUMENTS 9,174,889 B2 * 11/2015 Epshteyn ............... B82Y 30/00

* cited by examiner

*Primary Examiner* — Aileen B Felton

(74) *Attorney, Agent, or Firm* — US Naval Research Laboratory; Joseph T. Grunkemeyer

(57) ABSTRACT

A nanoparticle of a decomposition product of a transition metal aluminum hydride compound, a transition metal borohydride compound, or a transition metal gallium hydride compound. A process of: reacting a transition metal salt with an aluminum hydride compound, a borohydride compound, or a gallium hydride compound to produce one or more of the nanoparticles. The reaction occurs in solution while being sonicated at a temperature at which the metal hydride compound decomposes. A process of: reacting a nanoparticle with a compound containing at least two hydroxyl groups to form a coating having multi-dentate metal-alkoxides.

4 Claims, 11 Drawing Sheets

Ti-B-H powder (yield = 3.4 g)

METAL HYDRIDE NANOPARTICLES

REFERENCE TO RELATED APPLICATIONS

This application is a continuation-in-part application of U.S. Pat. No. 11,939,276, issued on Mar. 26, 2024, which is a divisional application of U.S. Pat. No. 10,889,531, issued on Jan. 12, 2021. The provisional application and all other publications and patent documents referred to throughout this nonprovisional application are incorporated herein by reference.

TECHNICAL FIELD

The disclosed materials and methods are generally related to metal and metal-hydride nanoparticles.

DESCRIPTION OF THE RELATED ART

Generally the currently used materials for metalizing of energetic formulations are micron scale aluminum particles. The main problems associated with the burn properties of the traditional metal additives in energetic formulations have to do with the burn kinetics/speed being impeded by the aluminum oxide coating of the particles which arises naturally from the materials being exposed to air. The nanoscale Al materials with various passivators for energetic formulations have been explored on an experimental basis (Berry et al., "Synthesis and characterization of a nanophase zirconium powder" *J. of Mat. Chem.,* 13, 2388-2393 (2003); Jouet et al., "Surface Passivation of Bare Aluminum Nanoparticles Using Perfluoroalkyl Carboxylic Acids" *Chem. of Mat.,* 17, 2987-2996 (2005); Jouet et al., "Preparation and reactivity analysis of novel perfluoroalkyl coated aluminum nanocomposites" *Mat. Sci. Technol.,* 22, 422-429 (2006). All publications and patent documents referenced throughout this nonprovisional are incorporated herein by reference.)

Larger scale synthesis of air and moisture sensitive metal nanoparticles is a challenge, and poses an obstacle to investigating the physical properties of the nano-scale materials via traditional techniques that expose the materials to air. To obtain materials that do not oxidize when handled in air while still retaining their properties, the surface of the nanoparticles can be protected by a passivating agent. In order to keep the intrinsic properties of the unpassivated material, it is desirable to maximize the active metal content of the material while minimizing the amount of passivator present on the nanoparticle surface.

Synthesis of metal and alloy powders at high temperatures can impart homogeneity, crystallinity, and stability; however, some applications benefit from heterogeneity and amorphous metals due to their increased reactivity. For example, amorphous/nanocrystalline borides show increased activity as dehydrogenation catalysts and battery anodes over their crystalline counterparts. {Li, 2012 #213; Liu, 2014 #209; Mitov, 1999 #272; Zhao, 2013 #271}. Along with being active dehydrogenation catalysts, Ti—B alloys are also attractive as metal fuels and propellants due to their low cost and high volumetric energy density. {Dreizin, 2009 #50; Galfetti, 2006 #38; Wen, 2010 #137} Hydrogen is also a coveted chemical energy storage medium, but suffers from low volumetric energy density. Hence, a material comprised of metallic Ti—B and hydrogen could mitigate the low volumetric energy density intrinsic to hydrogen while increasing the overall energy density of the Ti—B, thereby producing a reactive, high energy density material.

SUMMARY OF THE INVENTION

Disclosed herein is a process comprising: a reacting $Ti(BH_4)_3$ with $LiAlH_4$ in an aprotic solvent while being sonicated to produce nanoparticles comprising titanium, boron, and hydrogen; and annealing the nanoparticles under a vacuum.

Also disclosed herein is a process comprising: reacting a transition metal salt with an aluminum hydride compound and a borohydride compound to produce one or more nanoparticles comprising decomposition products of the aluminum hydride compound and the borohydride compound. The reaction occurs in solution while being sonicated at a temperature at which the aluminum hydride compound and the borohydride compound decompose.

BRIEF DESCRIPTION OF DRAWINGS

A more complete appreciation will be readily obtained by reference to the following Description of the Example Embodiments and the accompanying drawings.

(FIGS. 7A and 7D), 425° C. (FIGS. 7B and 7E), and 720° C. (FIGS. 7C and 7F).

DETAILED DESCRIPTION

Figure 1:
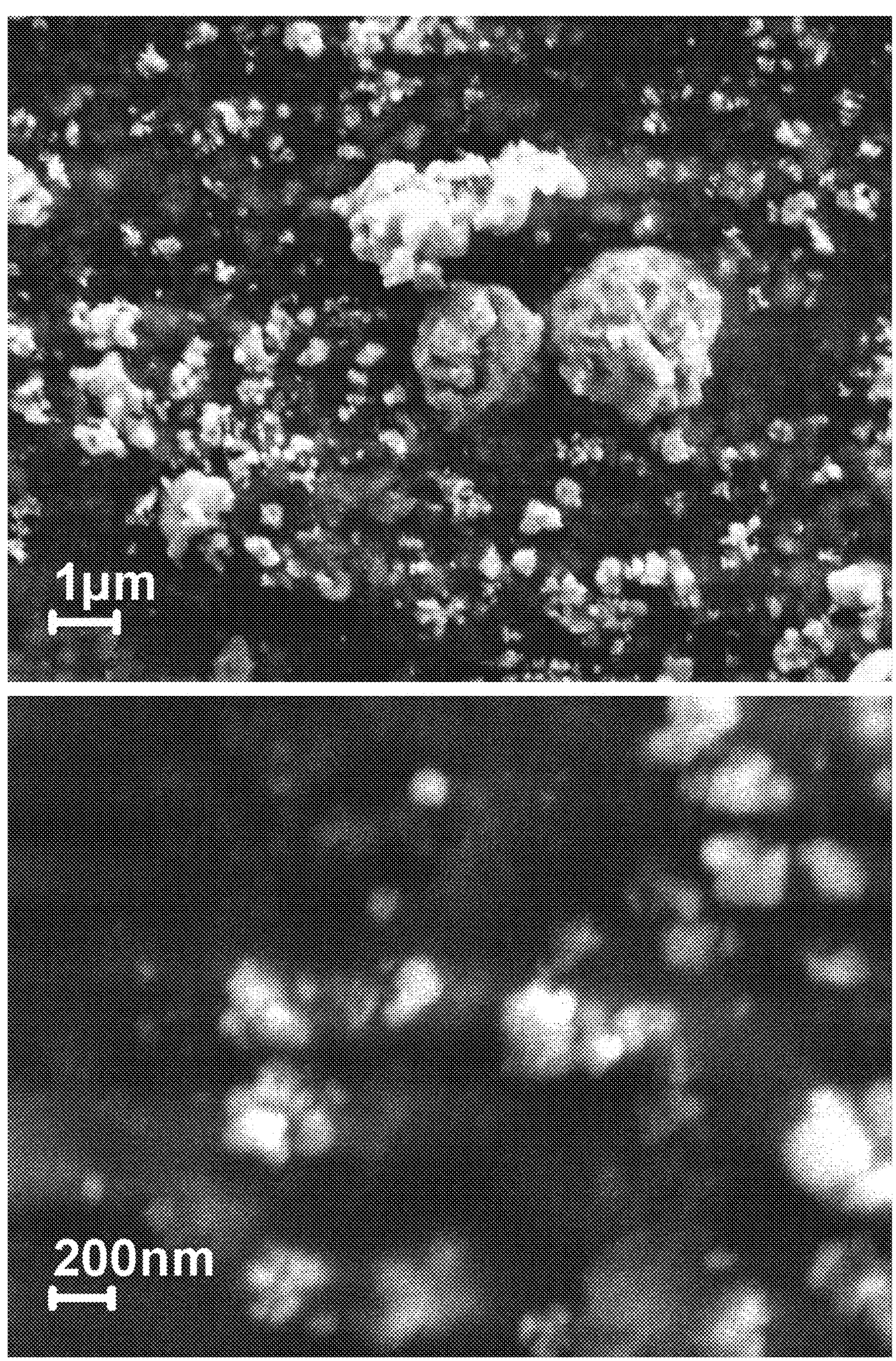
FIG. 1 shows SEM micrographs of material 4 (Example 4) showing the blurring that occurs at higher magnification (bottom) as compared to lower magnification (top)

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed is a homogeneous solution-based method used to produce well-defined passivated air and moisture stable transition metal aluminum/boron/gallium hydride nanoparticle materials. The synthesis may be accomplished via a multi-step process. A transition metal salt is reacted with an aluminum hydride compound, a borohydride compound, or a gallium hydride compound. The reaction occurs at a temperature at which the resulting transition metal hydride compound decomposes. For example, $ZrCl_4$ or $Zr(BH_4)_4$ may be reacted with $LiAlH_4$ at room temperature. $Zr(AlH_4)_4$ is produced, which decomposes at room temperature. The metal hydride compounds can contain hydrogen-bridging bonds, which may break during decomposition. This results in the loss of some, but not necessarily all of the hydrogen in the nanoparticles in the form of hydrogen gas. The use of sonication in solution may cause nucleation of the decomposition products so that nanoparticles are formed.

Suitable transition metals in the transition metal salt include, but are not limited to, zirconium, hafnium, titanium, vanadium, scandium, yttrium, niobium, chromium, tantalum, thorium, or uranium. Reaction of a hafnium salt with a borohydride may produce $HfB_2$ as a decomposition product, which has a particularly high volumetric heat of combustion.

The nanoparticles may be annealed after they are formed. Annealing can convert amorphous material into crystalline material, and may drive off some or all of the remaining hydrogen. It may also cause reaction of some or all of any unreacted salts remaining in the nanoparticles. The annealing may be performed under vacuum at a temperature that is up to from about one third to one half the melting point (Kelvin) of the decomposition product in order to drive the dehydrogenation reaction to completion and further nucleate and/or crystallize the particles.

In a next step, a coating is formed on the nanoparticle by reacting it with a compound containing at least two hydroxyl groups to form a coating comprising multi-dentate metal-alkoxides. Suitable compounds include, but are not limited to, glycerol, sorbitol, and a carbohydrate.

The coating may be in the form of a xerogel from heating the reaction followed by drying in a vacuum, which causes shrinkage of the gel and possible entrapped solvent. The aluminum or other metal can act as a crosslinking site for formation of the coating, as aluminum can bind to 6 oxygen atoms. The process may pull some aluminum or other metal atoms from the surface of the nanoparticle and into the coating.

A coating made from glycerol, a small molecule, may be relatively thick since the growing gel coating is more permeable for addition of more glycerol—a relatively small molecule The thicker coatings may be desirable for gas permeable applications where the fraction of reactive metal is less important. Larger compounds such as sorbitol may form a thinner coating, which may be desirable for maximizing the reactive metal content for applications such as energetic materials. The resulting material may be air and moisture resistant/stable, and contain upwards of >90% of active metal by mass, and may be used as a metalizing additive for energetic formulations.

The same type of coating may also be formed on other types of nanoparticles that contain a metal that reacts with hydroxyl groups to form a metal-alkoxides. Suitable nanoparticles may contain aluminum, boron, silicon, zirconium, or hafnium, for example.

The initial reaction to produce the zirconium aluminum hydride was via decomposition of zirconium tetrahydroaluminate ($Zr(AlH_4)_4$) while exposed to ultrasound produced by a benchtop ultrasonic bath. The particles were surface passivated using carbohydrates and were shown to be stable in air and partially stable in water. TEM imaging suggests the existence of smaller particles made of a Zr—Al alloy that range in size from 1.8 nm to 7.9 nm in diameter and are interspersed with larger particles that range from tens to hundreds of nanometers in diameter. It was also shown that the carbohydrate-derived coating of the nanoparticles is present as an aluminum alkoxide gel surrounding the core particles.

Based on the initial characterization of materials 1-5 (Examples 1-5), these materials have been shown to contain mainly Zr and Al, and the passivated versions of these materials are robust and are air and moisture stable. Based on the elemental analysis results, in the best case, Zr and Al constitute more than 90% of material 5. It has also been shown that by varying the size of the carbohydrate that was used as the passivator it is possible to change the amount of passivator remaining on the surface of the nanoparticles. Based on the TEM images of the larger particles, combined with EDS data, it is possible to suggest a model for the structures that is cocoon-like. The cocoon shell consists of interlinked multi-dentate metal-alkoxides that form a polymeric shell (aerogel) that surrounds the metal-hydride particle.

This method can produce particles of smaller size that are moisture and air stable, which will enable better burn properties. This method can be extended to other higher density transition metals, such as Hf, Ta, Th, and U, which would produce much higher density materials, giving the munitions that carry it greater momentum while retaining the same burn/shock wave characteristics as the lighter metals currently used.

Also disclosed is a room temperature approach to the gram scale production of hydrogen-loaded amorphous solid-solution titanium-boron powders. The advantages of using this low temperature synthesis method are two-fold: 1) the low temperature catalytic decomposition of $Ti(BH_4)_3$ to elemental Ti and B is incomplete and results in retained hydrogen; 2) the low reaction temperatures prevent the alloying of the Ti and B to thermodynamic Ti—B crystal phases. Trapping the Ti and B in a thermodynamically unstable state and retaining hydrogen increases the energy stored in the powders. {Trunov, 2008 #192} {Epshteyn, 2009 #260; Epshteyn, 2013 #215}

The solution synthesis of Ti—B powders has been reported via the generation of $Ti(BH_4)_3$, followed by thermal decomposition to $TiB_2$. $Ti(BH_4)_3$ is formed in solution by adding an alkali metal borohydride (commonly Li or Na) to $TiCl_4$ in an ethereal solvent, under air free conditions. {Bates, 1995 #203; Chen, 2004 #189; Gu, 2003 #190; Jensen, 1988 #207} The $TiCl_4$ is reduced to the Ti(III) oxidation state by one equivalent of $BH_4^-$, while the other three equivalents of $BH_4^-$ substitute the remaining chlorides. $H_2$ and $B_2H_6$ gasses, as well as LiCl solid byproducts are formed. The $Ti(BH_4)_3$ is unstable at room temperature and is reported to undergo autocatalytic decomposition and dehydrogenation on the order of days. {Hoekstra, 1949 #204} Hence, thermal decomposition is commonly used to impart stability and form $TiB_2$. {Bates, 1995 #203} Here, $LiAlH_4$ is used to initiate the partial decomposition of $Ti(BH_4)_3$ at room temperature under sonication. Using this approach to induce only partial decomposition is important to retain hydrogen that is preserved over extended time scales in the amorphous product. A schematic for an example proposed reaction mechanism is shown below. The process is shown schematically in FIG. 5.

$$1TiCl_4+4LiBH_4 \rightarrow 1Ti(BH_4)_3+4LiCl+0.5B_2H_6\,(g)+0.5H_2\,(g)$$

$$1Ti(BH_4)_3+0.1LiAlH_4 \rightarrow Ti\text{—}B\text{—}H(powder)+B_2H_6\,(g)+H_2\,(g)$$

At least the second step above is performed in an aprotic solvent while being sonicated, followed by annealing the nanoparticles under a vacuum. The molar ratio of $Ti(BH_4)_3$ to $LiAlH_4$ may be, for example, from 1:1 to 1,000,000:1 or from 1:1 to 12:1. Suitable aprotic solvents include, but are not limited to diethyl ether, acetonitrile, toluene, tetrahydrofuran, dimethyl ether, any solvent in the glyme series, and dioxane. The solvent may be one that can solubilize $Ti(BH_4)_3$ and $LiAlH_4$.

The sonication may be performed at, for example, −15° C. to 97° C. or room temperature (such as 20° C. to 25° C.). The anneal may be performed at, for example, 50° C. to 2000° C., 500° C. to 900° C., 700° C. to 750° C., or 700° C. to 2000° C. The vacuum may have a maximum pressure of 10, 100, or 1000 mTorr, with a maximum ppm of water and/or oxygen of 2, 5, or 10.

The resulting nanopowder may comprise at least 90 wt. % elemental amorphous titanium and elemental amorphous boron, and further may comprise no more than 5 wt. % of total crystalline titanium or boron, alloyed titanium and boron, and titanium-boron compounds.

The following examples are given to illustrate specific applications. These specific examples are not intended to limit the scope of the disclosure in this application.

General—All air and moisture sensitive manipulations were performed in a Vacuum Atmospheres glove box under an atmosphere of helium or via traditional Schlenk technique under an atmosphere of nitrogen. Dry diethyl ether ($Et_2O$) was purchased from Aldrich packaged under nitrogen in a SureSeal bottle, and was used without further purification. Glycerol was purchased from Aldrich and was vacuum distilled prior to use. Lithium aluminum hydride ($LiAlH_4$) was purchased from Aldrich and was further purified by dissolution in $Et_2O$, followed by vacuum filtration and removal of volatiles in vacuo. Lithium borohydride ($LiBH_4$) and zirconium (IV) chloride ($ZrCl_4$) was purchased from Aldrich and used as provided. Zirconium borohydride ($Zr(BH_4)_4$) was prepared as previously reported in literature (Reird et al. *J. Electrochem. Soc.,* 104(1), 21 (1957)). Oxygen bomb calorimetry was performed using a Parr model 1341 Oxygen Bomb calorimeter with a model 1104 Oxygen Combustion Bomb. Microanalysis was performed by Complete Analysis Laboratories, Inc. SEM imaging was performed using a LEO 1550. TEM imaging was performed using a JEOL 2200FS, equipped with a Gatan Ultrascan charge coupled device (CCD) camera. $^{27}$Al-NMR was performed on a Bruker DMX500 at 11.7 T.

Example 1—Synthesis of material 1 from $ZrCl_4$ and $LiAlH_4$—From a 200 mL Schlenk flask a clear solution containing 665 mg of $LiAlH_4$ (LAH) in 80 mL of $Et_2O$ was transferred dropwise via canula over 2 h to a round-bottom 300 mL storage flask fitted with teflon valve joint, which contained 1.02 g of $ZrCl_4$ suspended in 100 mL of $Et_2O$ being sonicated in ice-water in a VWR 50HT benchtop ultrasonic cleaning bath. Upon initial addition a white precipitate appeared in solution, producing a white slurry. Once the addition was completed, the flask was closed with a Kontes Teflon valve and allowed to sonicate overnight at ~50° C. (ultrasonic bath operating temperature) producing a black slurry. Volatiles were then removed in vacuo and 1.81 g of solids was isolated. The material was placed into a Pyrex sublimator and heated to 340° C. under dynamic vacuum. 1.66 g of the product black powder 1 was isolated.

Example 2—Synthesis of material 2 from $Zr(BH_4)_4$ and LAH—From a 200 mL Schlenk flask a clear solution containing 3.49 g of LAH in 120 mL of $Et_2O$ was transferred dropwise via canula over 2 h to a round-bottom 500 mL storage flask fitted with teflon valve joint, which contained 3.46 g of $Zr(BH_4)_4$ dissolved in 100 mL of $Et_2O$ and the reaction was performed in the same manner as synthesis of material 1. Following the initial reaction, the flask was then taken into a glovebox, and a black powder material was centrifuged out of the slurry using a benchtop centrifuge inside the glovebox. The black powder was then washed three times with 80 mL portions of $Et_2O$ by mixing the powder and the $Et_2O$ using a Pasteur pipette and centrifuging the material back out of the slurry. The material was then placed into a vacuum bulb and dried at room temperature (RT) under dynamic vacuum overnight to ~200 torr, producing 5.25 g of black powder material 2.

Example 3—Passivation of material 1 with glycerol to make material 3—1.51 g of 1 was mixed with 5 mL of glycerol in a 100 mL Schlenk flask with a ground-glass stopper. It was then placed on a Schlenk line and the flask was heated overnight in a paraffin oil bath to 125° C., initially producing visible bubbling, which eventually subsided. The material was then cooled to RT and washed with ethanol (EtOH) in air and spun down in a benchtop high-speed centrifuge. The product black powder was dried under dynamic vacuum at 40° C. producing 1.67 g of product black powder 3.

Example 4—Passivation of material 2 with glycerol to make material 4—1.03 g of 2 was placed in a 20 mL vial and mixed with 2 mL of glycerol by manual agitation. Upon mixing with the glycerol the material formed a black suspension which was visibly gently frothing. The foaming subsided after 1 h, and the vial containing the slurry was heated to about ~50° C. The reaction began to foam vigorously, which necessitated the transfer of approximately half of the reaction to a second 20 mL vial. The vials were allowed to stand at ~50° C. for two days after which they were taken out of the glovebox, and portions of EtOH were added to them to wash away the glycerol. The material visibly reacted with the EtOH producing bubbling. After three EtOH wash and centrifugation cycles the bubbling was no longer noticeable. 1.30 g of black powder material 5 was recovered after drying under dynamic vacuum overnight, and taken into the glovebox for storage.

Example 5—Passivation of material 2 with D-sorbitol to make material 5—In the glovebox, 372 mg of powder 2 was mixed with ~1.5 g of D-sorbitol powder in a 50 mL beaker and gently heated on a hot-plate until melting of the sorbitol was observed. The entirety of the contents of the beaker was allowed to melt while the suspension was manually agitated to mix it thoroughly. The liquid was visibly frothing and was allowed to stand on the hotplate overnight at ~110° C. Immediately following, ~2.5 g of glycerol was added to the mixture and stirred in with a spatula. The black suspension was then allowed to cool to RT and taken out of the glovebox, after which 10 mL of EtOH was added and mixed into the suspension. This produced mild but visible bubbling, indicating a reaction of EtOH with the particles. The material was repeatedly washed with 40 mL portions of EtOH and spun down in a benchtop centrifuge in order to remove any remaining excess sorbitol and glycerol. The material was then dried at RT under dynamic vacuum overnight producing 433 mg of product black powder 5.

Example 6—SEM—The particles that were observed by SEM showed a wide distribution of sizes. The SEM images of materials 3, 4, and 5 were significantly limited with blurring occurring at higher magnifications due to charging on the surface of the particles, as would be expected from particles that are non-conductive (see FIG. 1).

Figure 2:
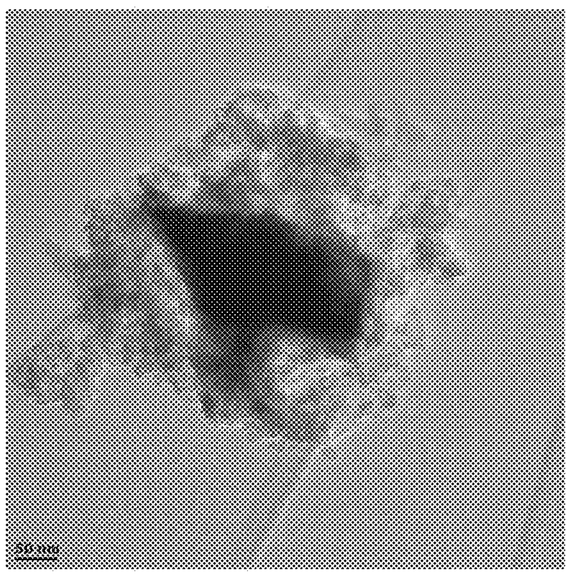
FIG. 2 shows TEM micrographs of material 3 (Example 3). Top: large particle enveloped in metal-alkoxide; Center: a population of small nanoparticles on carbon background; Bottom: lattice fringing observed from nanoparticle overhanging on edge of carbon grid.
Figure 2:
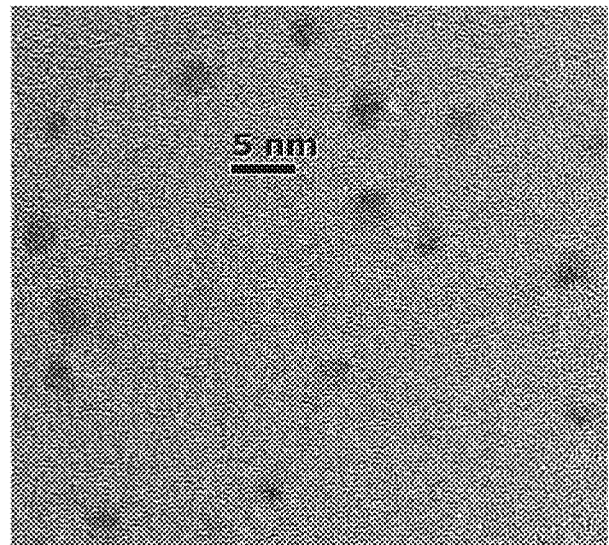
Figure 2:
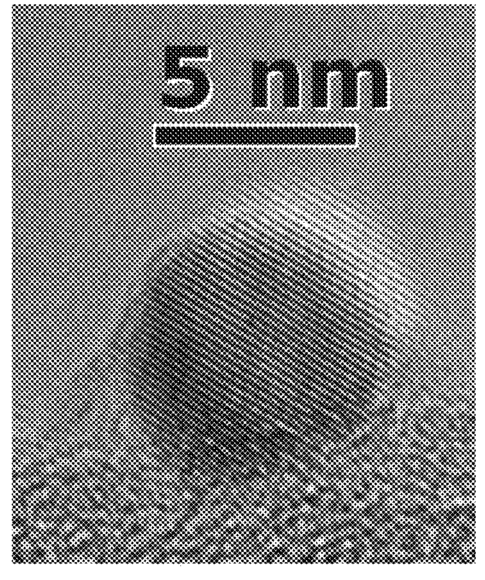

Example 7—TEM—TEM images of sample 3 suggest that it is a material made up of a mixture of particles that are heterogeneous in size, with the bulk of it made up of larger particles with diameter on the order of hundred(s) nanometers, which contain a core with a diameter of about half the total particle's diameter that is made up of a zirconium and aluminum material (FIG. 2). These cores are encased in cocoon-like shells made up of aluminum alkoxides. EDS performed on the central dark portion of the large particle seen on the top in FIG. 2 exhibited peaks for Al and Zr almost exclusively, while the surrounding material that appears to be amorphous exhibited peaks for Al, C, and O.

As seen in the center and bottom images of FIG. 2, there is TEM evidence of much smaller nanoparticles that range from 1.8 nm to 7.4 nm in diameter. Crystal lattice fringing is observed for these nanoparticles in the TEM images with d-spacings of 2.08, 2.10, 2.19, and 2.21 Å, which do not match any oxide or hydride phases of Al and Zr, however, there are mixed Zr—Al alloy phases that have peaks in the observed range, suggesting that the small nanoparticles are probably Zr—Al alloys (JCPDS Ref. #s 13-510, 16-75, 17-891). Any attempts to perform EDS on these particles were unsuccessful due to their small size.

Example 8—Microanalysis and oxygen bomb calorimetry—The microanalysis results from materials 1-5 are shown in Table 1. The passivated materials to be analyzed were shipped under air, while the unpassivated materials were shipped under helium. The results for C, H, and N are reported as an average of two trials no more than 0.10% different from one another.

TABLE 1

Microanalysis results for materials 1-5

| Material | % C | % H | % N | % Al | % Zr | R | R/% C |
|---|---|---|---|---|---|---|---|
| 1 | | | | | | | |
| 2 | 7.03 | 2.01 | 0.59 | 46.42 | 39.24 | 4.71 | 0.67 |
| 3 | 13.94 | 1.90 | 0.58 | 40.27 | 34.02 | 9.29 | 0.67 |
| 4 | 10.95 | 2.59 | 0.096 | | | | |
| 5 | 4.35 | 1.27 | trace | 49.58 | 41.91 | 2.89 | 0.66 |

The metal content for the samples was determined by atomic absorption (AA). Column R (remainder) in Table 1 gives the value of the remainder from 100%, presumed to be O content as supported by the constant ratio of R to % C for the passivated samples 3-5 (last column of Table 1). From these results it is apparent that materials 3, 4, and 5 are passivated against short-term (several days) air degradation. Furthermore, material 5 was stored in air for 15 days prior to being shipped for microanalysis, and it still exhibits the best mass ratio of metal to passivator (organic portion).

According to the CRC Handbook of Chemistry and Physics, the heats of combustion of Zr and Al metals in $O_2$ are 2.9 kcal/g and 7.4 kcal/g, respectively. Since carbohydrates have been used as passivating agent and when burned carbohydrates yield approximately 4 kcal/g, it would follow that the nanoparticles should fall somewhere between 2.9 and 7.4 kcal/g. The results from oxygen bomb calorimetry for materials 2-5 are reported in Table 2, with the reported $\Delta H_{obs}$ values being the observed heat output, and not the actual. (The actual ΔH values were not obtained due to the material reacting with $O_2$ prior to ignition.)

TABLE 2

Oxygen bomb calorimetry data for materials 2-5

| # | Conditions | $\Delta H_{obs}$ (kcal/g) |
|---|---|---|
| 2 | @ 30 atm $O_2$ | 1.48 |
| 3 | @ 30 atm $O_2$ | 4.01 |
| 4 | @ 30 atm $O_2$ | 4.34 |
| 5 | @ 30 atm $O_2$ | 3.56 |
| 5 | @ 40 atm $O_2$ | 2.11 |
| 5 | in paraffin wax @ 40 atm $O_2$ | 2.01 |
| 5 | aged 24 h in $dH_2O$ @ 40 atm $O_2$ | 4.61 |

Figure 3:
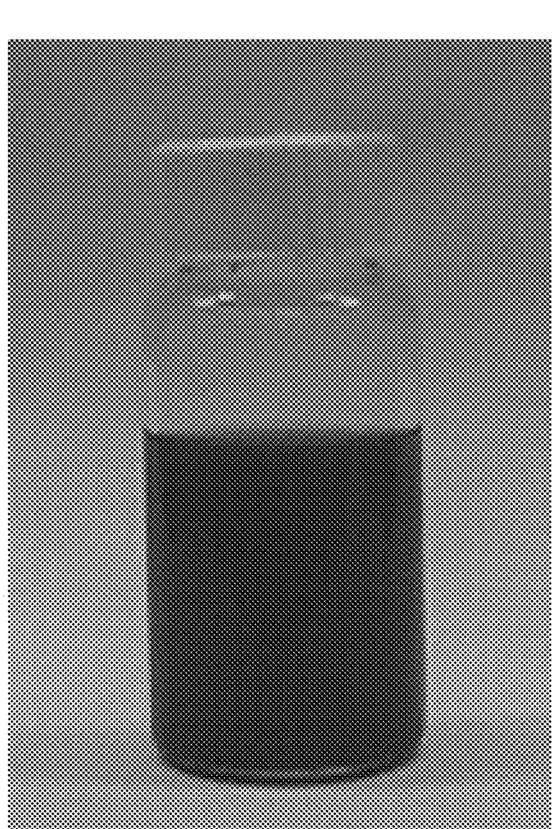
FIG. 3 shows material 5 (Example 5) initially (top) and after 24 h in $dH_2O$ (bottom)
Figure 3:
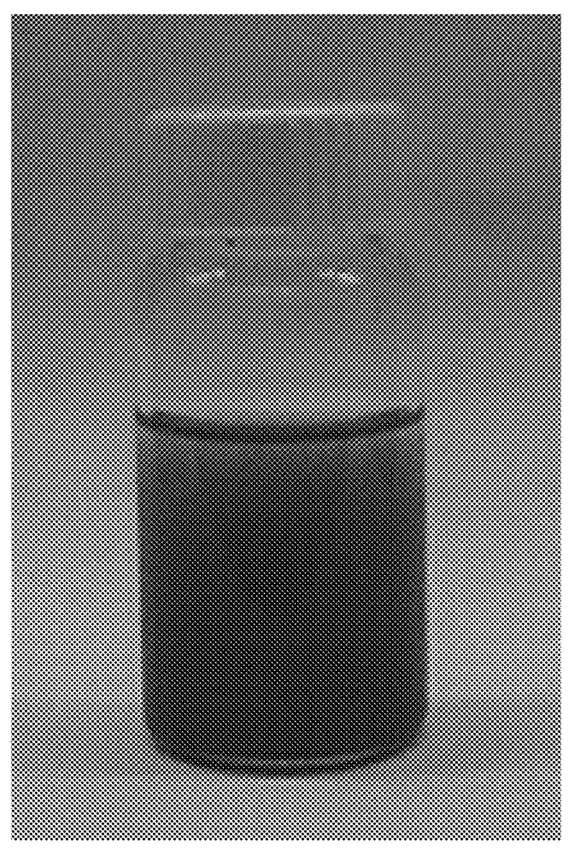

From the calorimetry data it is evident that the unprotected particles of material 2 are mostly oxidized before ignition occurs, as compared to the protected materials 4 and 5, which were made from 2. Another interesting observation is the difference in combustion energy output observed for material 5 when combusted at 30 versus 40 atm of $O_2$. The significantly lower energy output at the higher pressure confirms that even when passivated, the material reacts with $O_2$ prior to ignition. These previous calorimetry experiments were conducted in the presence of a known amount of ethylene glycol or glycerin, however, another attempt was made to obtain calorimetry data from material 5 by embedding it into paraffin wax; however, that yielded the same results as with ethylene glycol, showing that paraffin is inadequate at protecting the particles from 40 atm of $O_2$. Probably the most surprising result from calorimetry was the energy output observed for material 5 after it was dispersed in water for 24 h. The material was suspended in water and allowed to stand overnight as an experiment to observe how it would settle out, as seen in FIG. 3. The observed heat output from the water-treated material 5 was actually higher than for the same material before water treatment, suggesting that water reacts with the material's surface at least partially preventing $O_2$ from spontaneously reacting with particles. This is also supported by the observation of a slight evolution of gas bubbles when the particles were mixed with water. These results show that material 5 contains at least 4.61 kcal/g.

Example 9—$^{27}$Al Magic Angle Spinning NMR—From magic angle spinning experiments it was found that the unpassivated nanoparticle materials are electrically conductive, since they were producing eddy currents counteracting the instrument's magnetic field thereby resisting spinning. On the other hand, the passivated materials were found to be non-conductive and had no problem spinning.

Figure 4:
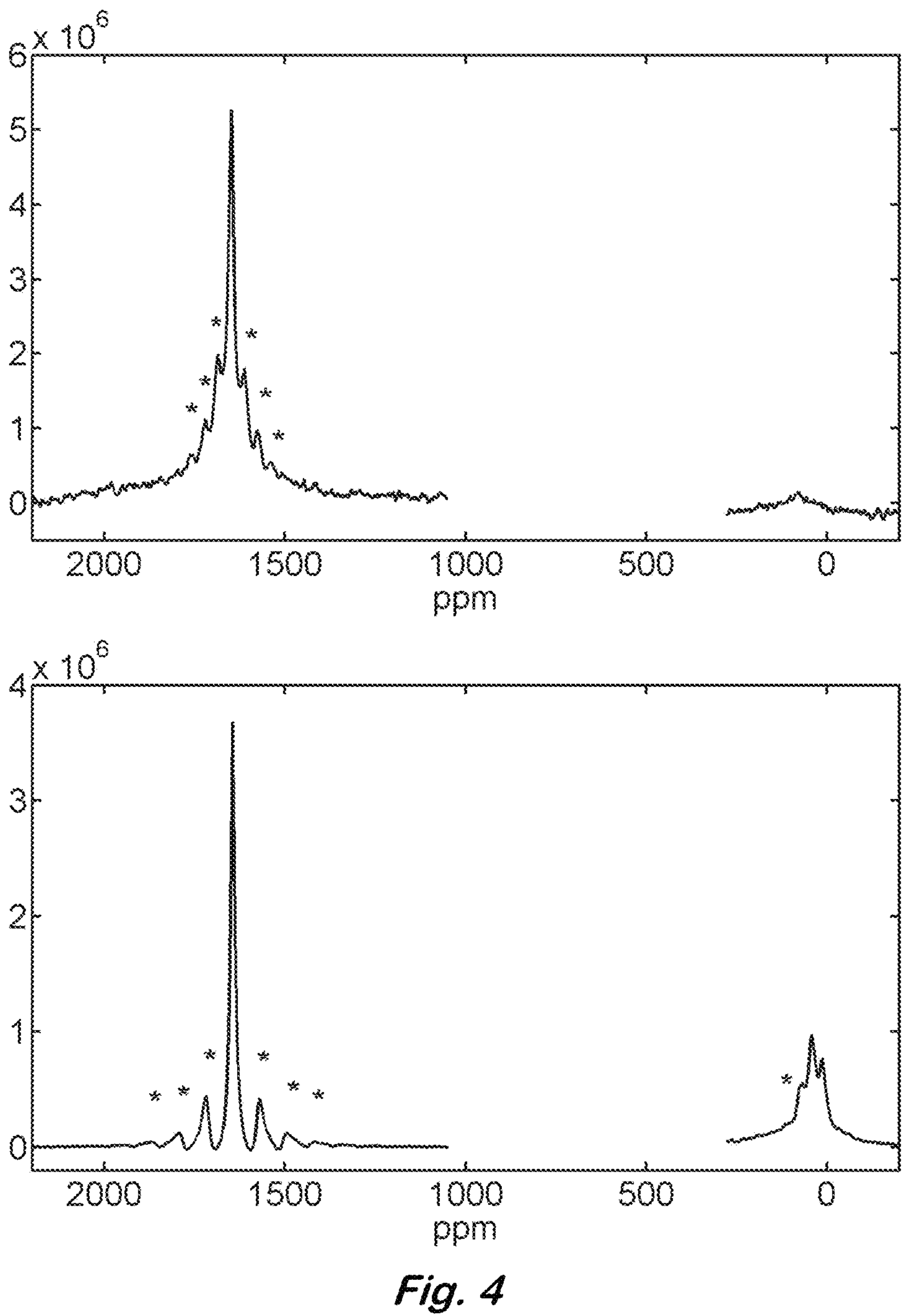
FIG. 4 shows $^{27}$Al-NMR of material 2 (Example 2) annealed at 89° C. under dynamic vacuum overnight (top) vs. $^{27}$Al-NMR material 5 (bottom). Asterisks denote spinning side-bands.

Initial magic angle spinning $^{27}$Al-NMR experiments have shown that there are two main peak regions for the Zr—Al nanoparticle materials, with the Al metal peak at 1646 ppm (relative to $Al^{+3}$ in $H_2O$) and the Al non-metal peaks have been observed in the 0-100 ppm region. As shown in FIG. 4, the unpassivated material exhibits a much smaller non-metal Al peak, whereas the passivated material has a significant non-metal Al peak.

Example 10—Synthesis of Hf—Al-nanoparticle material from $Hf(BH_4)_4$ and LAH—From a 200 mL Schlenk flask a clear solution containing 3.77 g of LAH in 120 mL of $Et_2O$ was transferred dropwise via canula over 2 h to a round-bottom 500 mL storage flask fitted with teflon valve joint, which contained 5.90 g of $Hf(BH_4)_4$ dissolved in 100 mL of $Et_2O$ while cooled to 0° C. and the reaction was sonicated overnight producing a black slurry. Following the initial reaction, the flask was then taken into a glovebox, and a black powder material was centrifuged out of the slurry using a benchtop centrifuge inside the glovebox. The black powder was then washed three times with 80 mL portions of $Et_2O$ by mixing the powder and the $Et_2O$ using a Pasteur pipette and centrifuging the material back out of the slurry. The material was then placed into a vacuum bulb and dried at 120° C. under dynamic vacuum overnight to ~200 torr, producing 7.08 g of black powder material.

Figure 5:
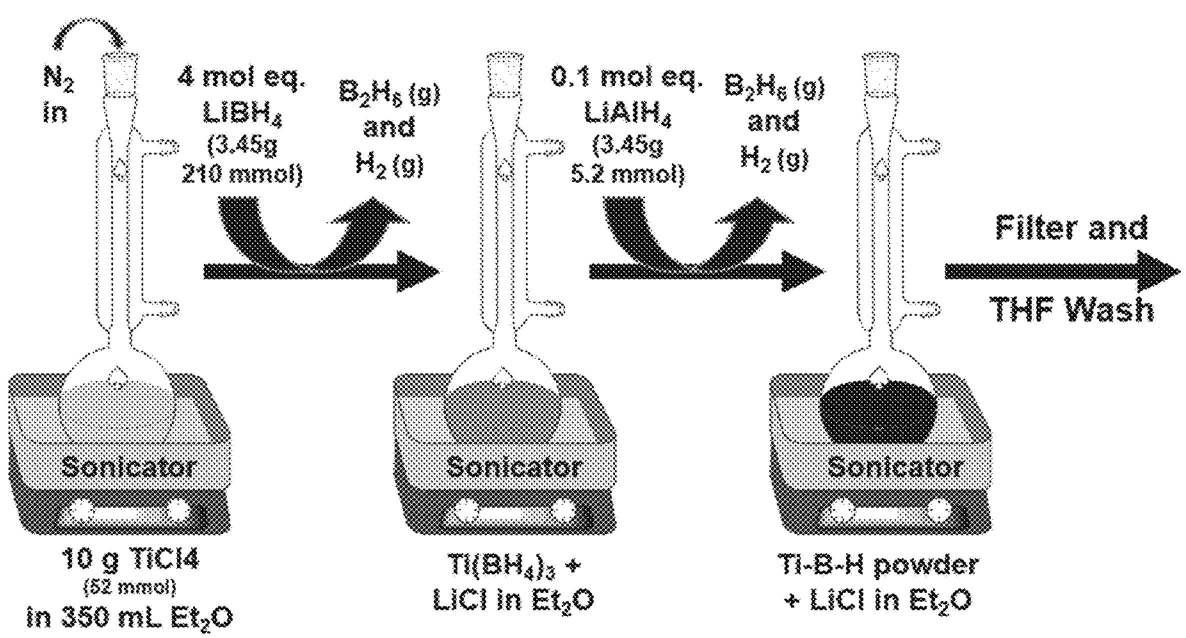
FIG. 5 shows general synthesis conditions and proposed reaction mechanism for Ti—B—H powders.
Figure 5:
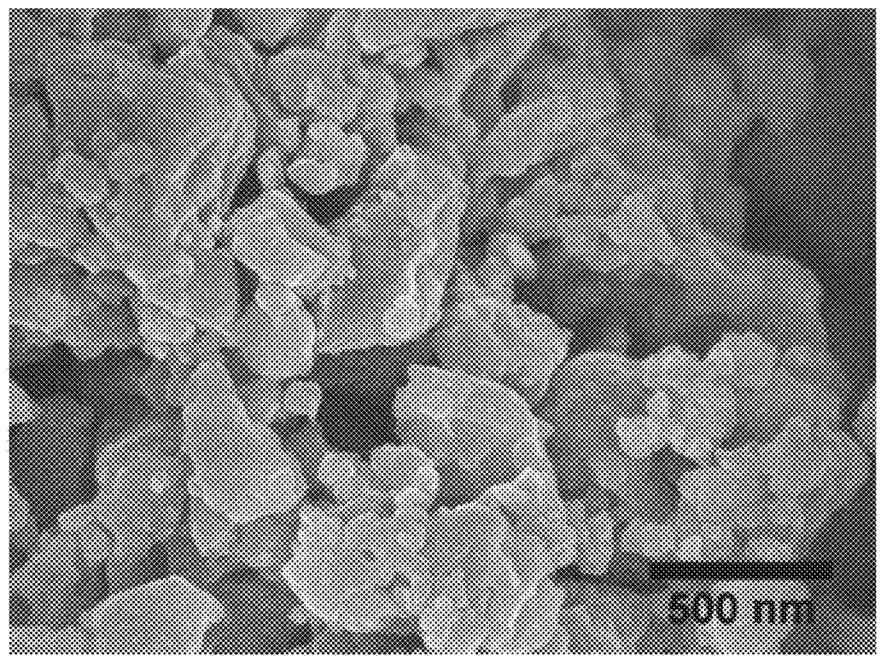
Figure 6:
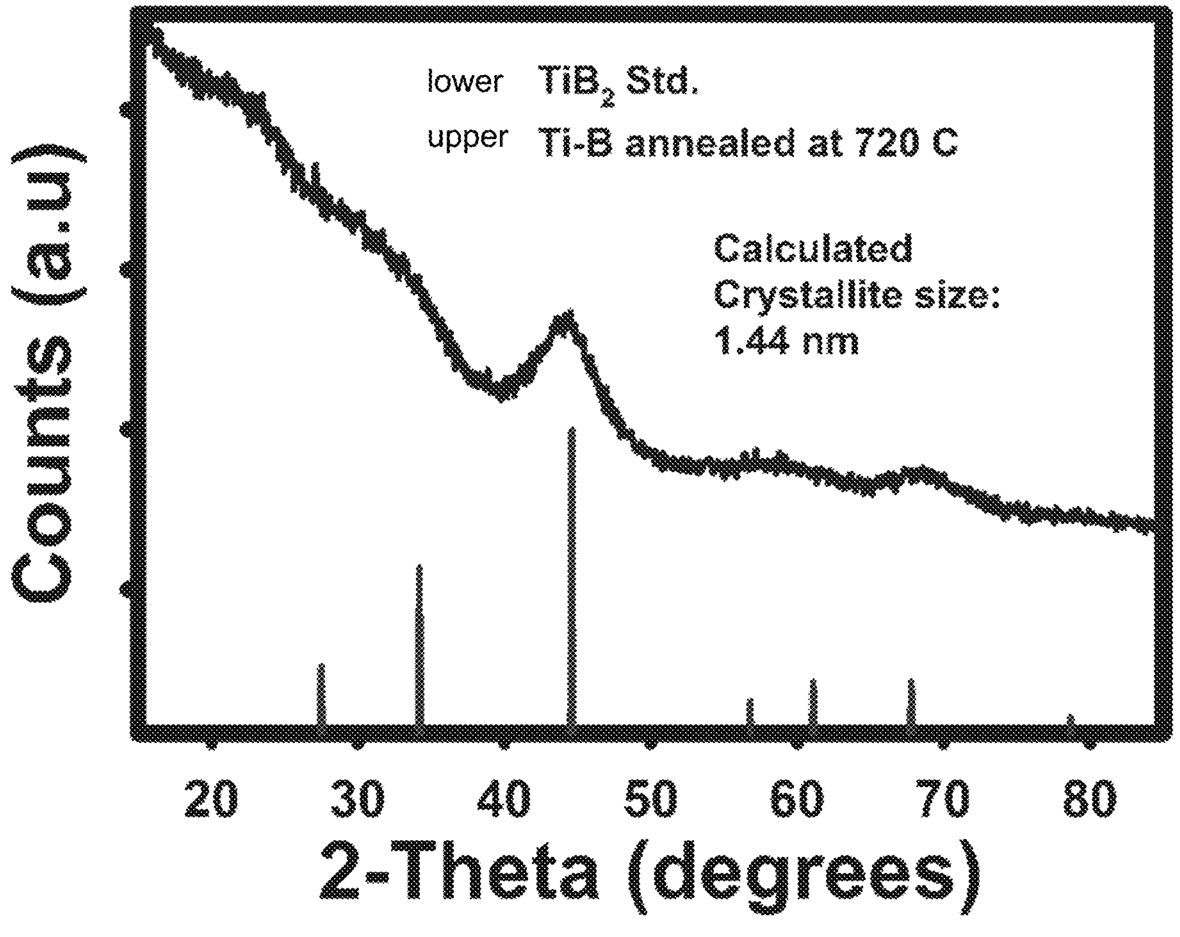
FIG. 6 shows an X-ray diffraction pattern for Ti—B powder heat treated at 720° C.

Example 11—Ti—B particles—$TiCl_4$, $LiBH_4$, and $LiAlH_4$ were reacted as shown in FIG. 5. The LiCl impurity was removed from the collected powder by washing numerous times with tetrahydrofuran (THF) to maintain room temperature processing conditions, in contrast to removing the LiCl by high temperature vacuum sublimation. {Bates, 1995 #203} The collected powders were heat treated under dynamic vacuum at 150° C., 450° C., and 720° C. to investigate any changes in crystallinity, reactivity, and morphology. From a crystallographic standpoint, the as-prepared powder as well as those heat treated at 150° C. and 450° C. were amorphous. The sample heat treated at 720° C. showed weak diffraction with d-spacings resembling a $TiB_2$ crystal phase (FIG. 6). The calculated crystallite size for the $TiB_2$ phase was 1.44 nm, based on peak widths. The occurrence of the $TiB_2$ phase upon high temperature annealing is commensurate with previous works. {Bates, 1995 #203}

Figures 7A, 7B, 7C, 7D, 7E, 7F:
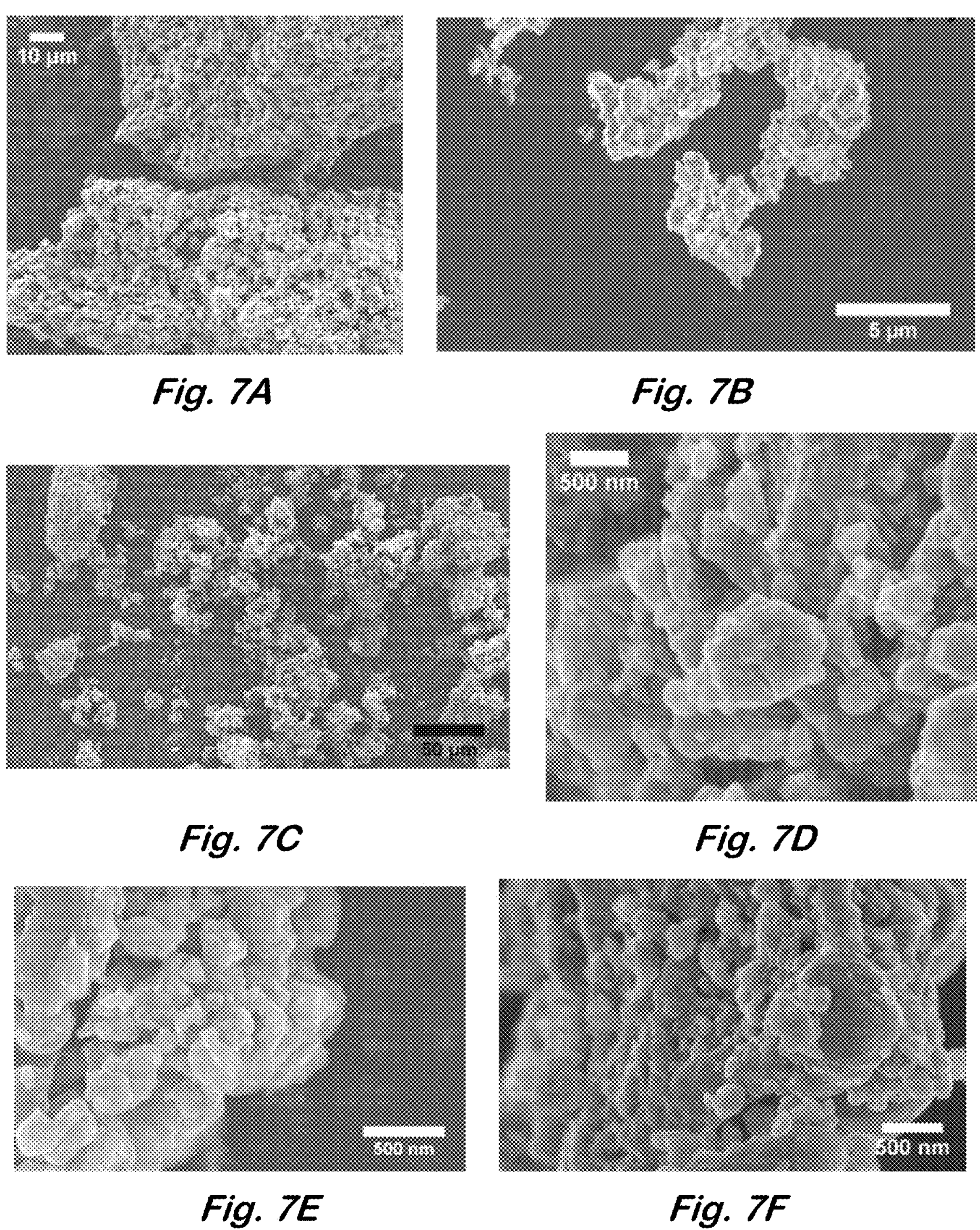
FIGS. 7A-F show scanning electron microscopy images of Ti—B powders heat treated at 150° C.

While heat treatment induced crystallinity, there was little effect observed on the overall particle size and shape of the Ti—B powders (FIG. 7). Primary particle diameters ranged from 100 nm-1 micron, possessing smooth surfaces with stochastic elliptical morphologies; secondary particle diameters ranged from 10 to hundreds of microns in diameter. Heat treating at higher temperatures resulted in no observable primary or secondary particle growth. The high degree of agglomeration witnessed for each sample has been previously reported for similar syntheses, and can be attributed to a lack of any strong surface coordinating or sterically hindering molecules used during the synthesis. {Epshteyn, 2013 #215} Diethyl ether, the solvent used, is a weakly coordinating solvent with minimal steric effects. Halide ions are reported to have shape and size directing capabilities; however the LiCl formed during the exchange of $BH_4^-$ for $Cl^-$ has poor solubility in diethyl ether and would preclude significant $Cl^-$ presence in solution and any possible halide ion effect on size or shape. {DuChene, 2013 #264; Lohse, 2014 #265}

Figure 8:
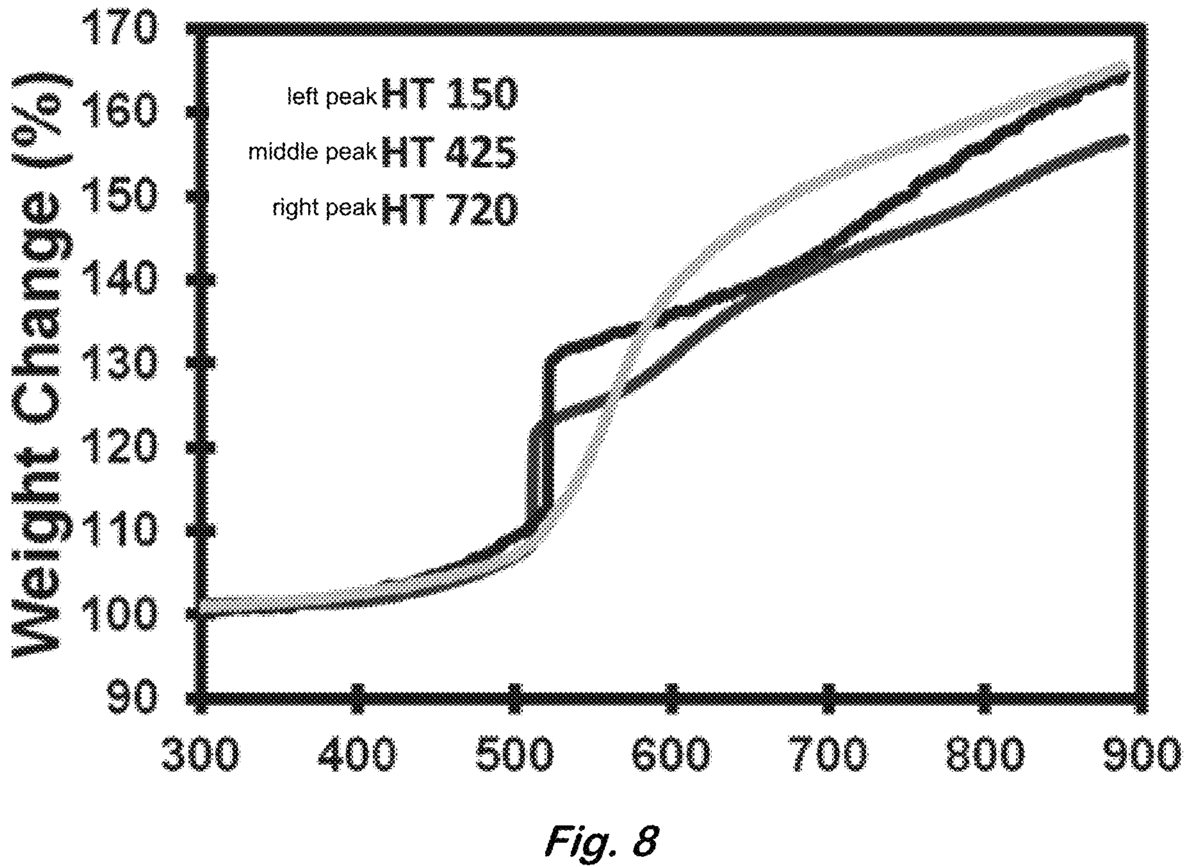
FIG. 8 shows TGA traces for Ti—B powders at a heating rate of 25° C./min under a 60% $O_2$ atmosphere.
Figure 9:
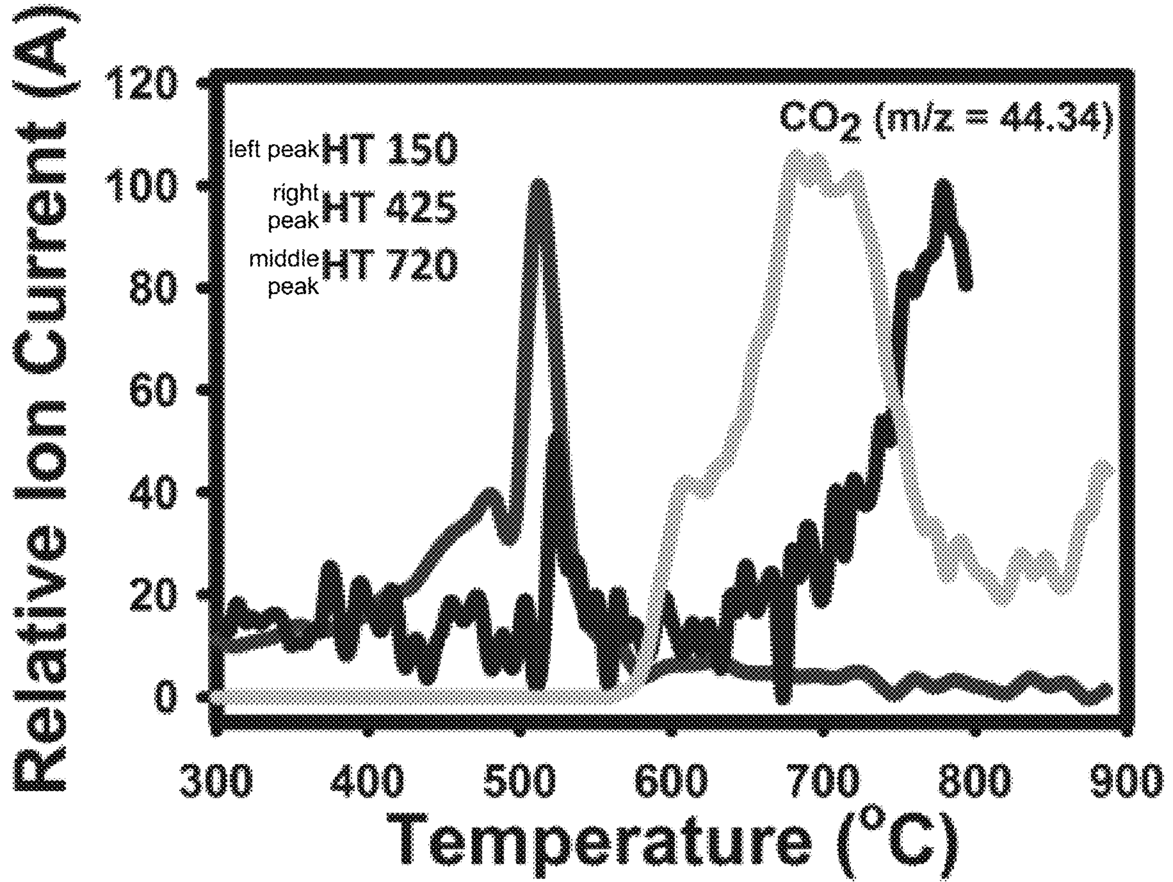
FIG. 9 shows MS (m/z=44) traces for Ti—B powders at a heating rate of 25° C./min under a 60% $O_2$ atmosphere.

Even though the ethereal solvents used are weakly coordinating, solvent coordination and activation can introduce contaminants during sample annealing. {Epshteyn, 2009 #260; Epshteyn, 2013 #215} Thermogravimetric analysis (FIG. 8) coupled with mass spectrometry (FIG. 9) (TGA-MS) of the evolved gases under a 60% $O_2$ atmosphere was used to identify contaminants. The as-prepared powders were pyrophoric when exposed to air and were not analyzed using this method. Powders heat treated at 150° C. displayed an initial sharp oxidation concurrent with a weight increase at 500° C. MS signal for $CO_2$ and $H_2O$ (m/z=44 and 18, respectively) were detected during this initial oxidation and is attributed to desorption of surface coordinated ethereal solvent. Above 500° C., a slow gradual weight increase occurs with no observable MS signal. Powders annealed at 450° C. also showed a sharp, initial oxidation around 500° C. and release of $CO_2$. However, a second release of $CO_2$ was observed above 700° C. and can be attributed to the decomposition of a TiC phase. {Vallauri, 2008 #263; Biedunkiewicz, 2011 #261; Shen, 2007 #262} Powders heat treated at 720° C. also showed the evolution of $CO_2$ at high temperatures, implying the presence of a TiC phase.

Figure 10:
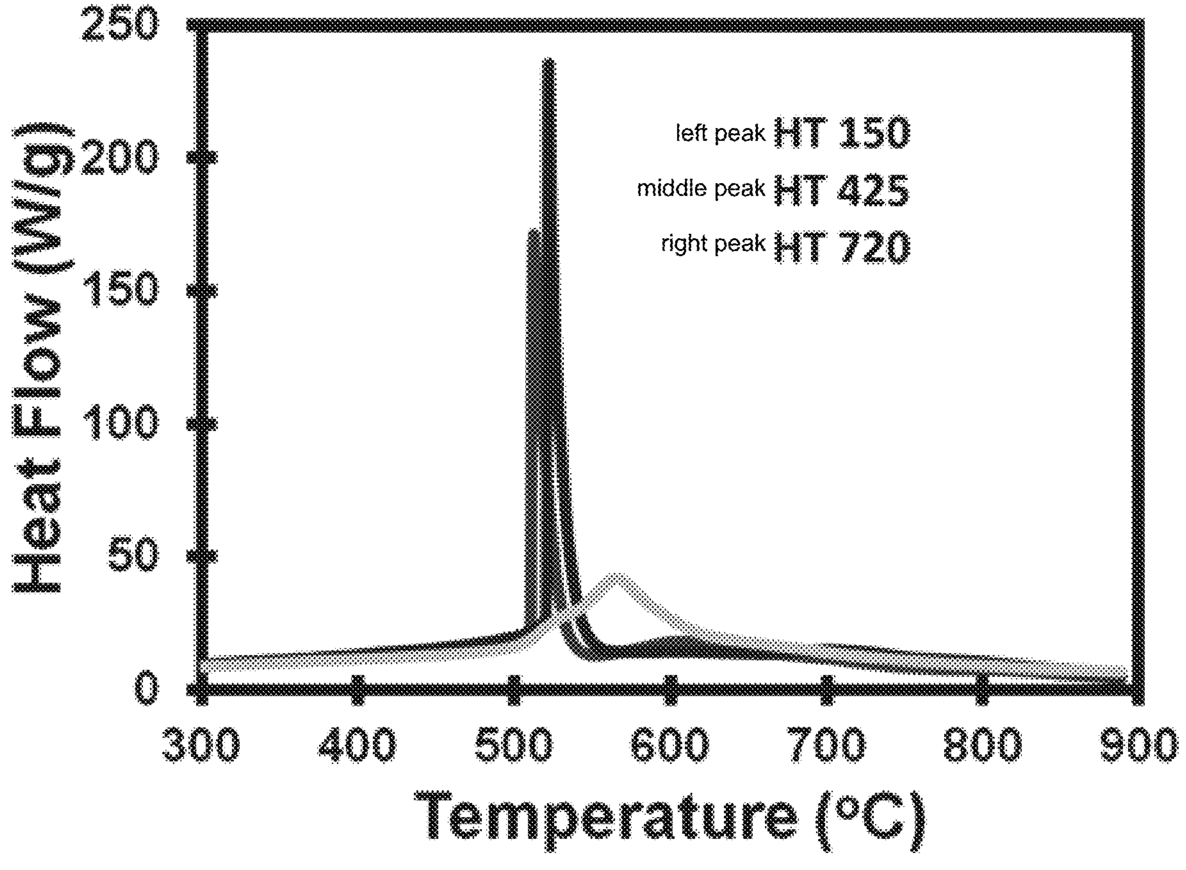
FIG. 10 shows DSC traces for Ti—B powders at a heating rate of 25° C./min under a 60% $O_2$ atmosphere.

Differential Scanning calorimetry (DSC) (FIG. 10) heat release values during heating under a 60% $O_2$ atmosphere where commensurate with mass gains witnessed in TGA traces. Heating at a rate of 25° C. min 1 caused powders heat treated at 150° C. and 450° C. to display a sharp exothermic event at 513° C. and 522° C., respectively. Powders heated at 720° C. showed a less intense, broader heat release beginning at 500° C. and persisting above 600° C. The observed exothermic events are due to the oxidation of the Ti and B metals to their more stable oxide forms. Slower heating rates resulted in the oxidation process occurring over a broader range of temperatures; however, for each heating rate the initiation of oxidation occurred at the lowest temperature for powders annealed at 150° C. and highest for powders annealed at 720° C.

From the collected DSC traces, the exothermic peak maxima were used to construct Kissinger Plots allowing for the calculation of the activation energy for thermo-oxidation. {Kissinger, 1957 #267} Powders heat treated at low temperatures showed the lowest activation energy, implying that powders are more reactive with lower heat treating temperatures. For comparison, the calculated activation energies for the prepared Ti—B powders were evaluated against commercially available Ti and B powders. The activation energy for oxidation for commercial Ti and B powders were 265 and 145 KJ/mol; which aligns well with reported literature values. {Kofstad, 1957 #225} The higher activation energy of the as prepared Ti—B powders implies that they are more stable against thermo-oxidation.

While stability against oxidation results in a material that is safer to store and handle, the efficiency and quantity of energy release is the most pertinent metric for any energy storage material. Thus, oxygen bomb calorimetry was used to access the energy storage capacity of prepared Ti—B powders, with the results shown in Table 3. Elemental Ti and B are expected to release 20 KJ/g and 58 KJ/g upon combustion, respectively. {Dreizin, 2009 #50} The value measured for pure commercial Ti powders was 19.75 KJ/g, very close to the expected value. The value measured for commercial boron powders is quite lower than expected; boron is well known to have poor combustion efficiency. {Ao, 2014 #61}. Theoretically, a mixture of a Ti atom and 2 B atoms should release 31.17 KJ/g, and crystalline $TiB_2$ is expected to release 27.15 KJ/g upon combustion. {Trunov', 2008'#192} Looking at Table 3, the prepared Ti—B powder that was not heat treated released 33.17 KJ/g; a value higher than expected for a powder containing a $TiB_2$ stoichiometry. With increasing heat treatment temperatures, powders showed a decrease in energy stored.

TABLE 3

Calorimetric properties of synthesized Ti—B powders

| Sample ID | Heat of combustion (kJ/g) | Activation energy (kJ/mol) |
|---|---|---|
| Ti—B as prepared | 33.17 | n/a |
| Ti—B annealed at 150 C. | 29.80 | 337.25 |
| Ti—B annealed at 425 C. | 26.30 | 402.41 |
| Ti—B annealed at 720 C. | 23.67 | 418.63 |
| Commercial Ti powder | 19.75 | 265.62 |
| Commercial B powder | 21.77 | 145.43 |

Figure 11:
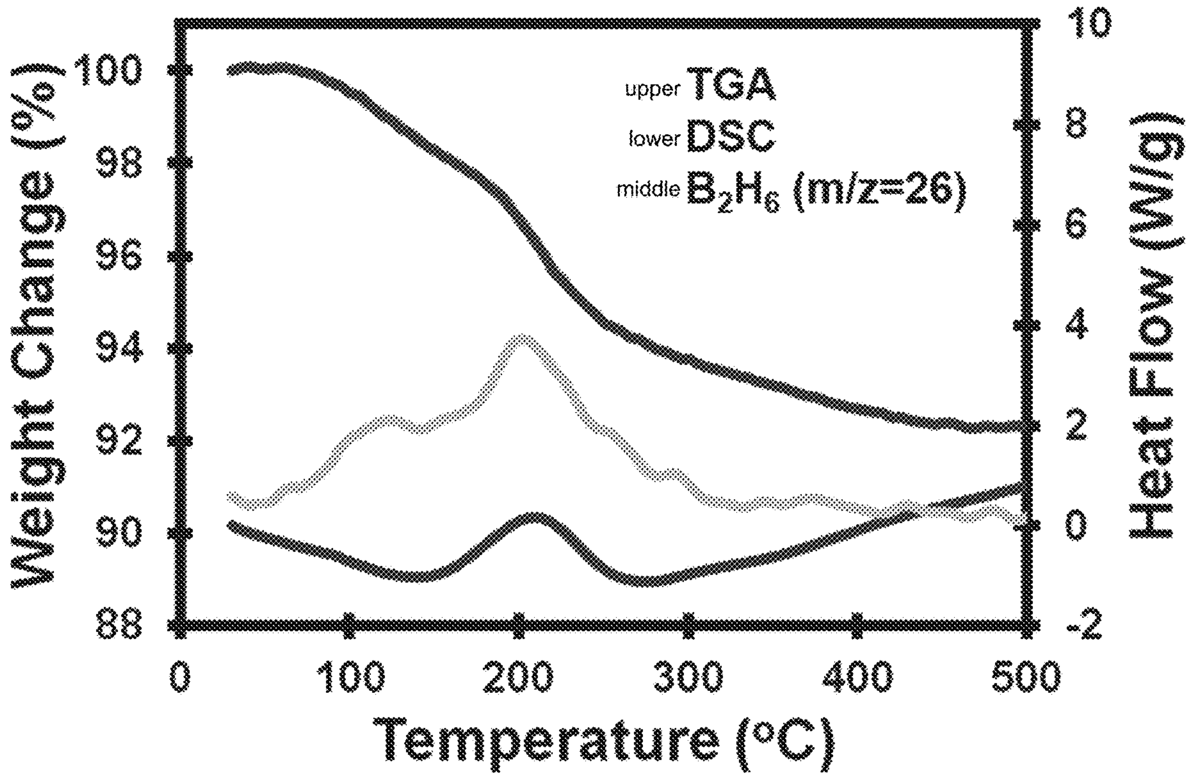
FIG. 11 shows TGA-MS and DSC traces for as prepared Ti—B powder under argon atmosphere.

As shown in the XRD and TGA results, mixtures of Ti, B, and C form stable TiC and $TiB_2$ crystal phases when heated. TiC and $TiB_2$ crystal phases are exothermic phases, meaning that they release energy in the form of heat upon formation. The formation of TiC and $TiB_2$ crystal phases release 3.07 KJ/g and 4.02 KJ/g, respectively. {Humphrey, 1951 #240; Trunov, 2008 #192} Hence, the decrease in energy output with increased heat treatment temperature can be attributed to the formation of TiC and $TiB_2$ phases. However it is unlikely that heat treating at 150° C. would induce alloy formation; TiC and $TiB_2$ phases are very refractory in nature. {Rudneva, 2007 #206} The relatively large decrease in heat output between the as prepared powders and those heated to 150° C. can be attributed to the release of volatile borohydrides, as shown in FIG. 11. The as prepared Ti—B powders lose 7.67% mass upon heating to 500° C.; this mass loss results in a significant MS signal for $B_2H_6$ (m/z=26). The majority of mass loss occurred between 100° C. and 250° C., which is commensurate with the reported decomposition temperature of 200° C. for $Ti(BH_4)_3$. $B_2H_6$ releases 73.48 KJ/g of heat upon combustion to form $B_2O_3$ and $H_2O$; hence by retaining boron and hydrogen, an 11% increase in combustion energy is measured between the as prepared Ti—B—H powders and powders heat treated at 150° C. It should be emphasized that the bomb calorimetry energies in Table 3 and TGA-MS data in FIG. 11 were collected several months after the initial synthesis, demonstrating the long term stability of the Ti—B—H composite powders.

Example 12—$Ti(BH_4)_3$ prepared in situ—$Ti(BH_4)_3(Et_2O)_2$ (as used herein, references to $Ti(BH_4)_3$ include $Ti(BH_4)_3(Et_2O)_2$) was prepared by adding 1600 mL $Et_2O$ via cannula transfer to $TiCl_4$ (40.004 g, 210.9 mmol) that had been frozen in liquid nitrogen. Warming the mixture to room temperature resulted in a yellow solution and precipitate. Solid $LiBH_4$ (18.37 g, 843.4 mmol) was then added and the solution stirred in a nitrogen atmosphere at room temperature for 24 hours. An evolution of gas began almost immediately upon the addition of the borohydride, and the color began to darken. After about 2 hours, the solution was colored green and became blue upon further stirring. The resulting solution was filtered through a fine glass frit to remove any unreacted $LiBH_4$ and LiCl biproducts. The bright blue filtrate was transferred to a 3 L pear-shaped flask with a built-in condenser at the top equipped with a sidearm and the opening controlled by a large ChemGlass Teflon-valve (size 20). The solution was allowed to sonicate under a nitrogen atmosphere. A second flask containing $LiAlH_4$ (0.800 g, 21.9 mmol) (amount can be varied depending on targeted Al equivalents) in 250-mL $Et_2O$ was prepared and the solution added rapidly to the $Ti(BH_4)_3(Et_2O)_2$ via cannula addition. After overnight sonication, during which the solution was allowed to reflux, the reactor was moved back into a glovebox and the solids were collected by filtering the reaction contents through a glass frit. The fine black powder that remained on the frit was further processed by heating under vacuum to the desired temperature (100° C., 120° C., 150° C., 200° C., 250° C., 300° C., 450° C., 500° C., 600° C., 700° C., 800° C., or) 900° C. for 24 hours. Lower temperatures can make the material sufficiently stable to use/formulate as a solid fuel. Higher temperatures, particularly above 300° C., can produce materials that are lower in energy content, but are more stable and easier to formulate. Once cooled to room temperature, the powder was washed with dry THF and dried in vacuo overnight.

Many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

The invention claimed is:

1. A process comprising:

forming a solution comprising $TiCl_4$ and an aprotic solvent;

adding $LiBH_4$ to the solution to form $Ti(BH_4)_3$;

filtering the solution to remove any solid $LiBH_4$ and LiCl from the solution and to form a filtrate comprising the $Ti(BH_4)_3$ dissolved in the aprotic solvent;

reacting the $Ti(BH_4)_3$ with $LiAlH_4$ in the aprotic solvent while being sonicated to produce nanoparticles comprising titanium, boron, and hydrogen;

wherein the molar ratio of the $Ti(BH_4)_3$ to the $LiAlH_4$ is from 1:1 to 1,000,000:1; and annealing the nanoparticles under a vacuum;

wherein the annealing is from 50° C. to 900° C.

2. The process of claim 1, wherein the molar ratio of the $Ti(BH_4)_3$ to the $LiAlH_4$ is from 1:1 to 12:1.

3. The process of claim 1, wherein the aprotic solvent is diethyl ether.

4. The process of claim 1, wherein the sonication is performed at −15° C. to 97° C.

* * * * *